Dec. 14, 1954 L. A. SMITH 2,697,141

NOISE ELIMINATING DEVICE FOR TELEPHONE TRANSMITTERS

Filed April 28, 1952

INVENTOR

Luther A. Smith,

BY C. B. Hamilton

ATTORNEY

United States Patent Office 2,697,141
Patented Dec. 14, 1954

2,697,141

NOISE ELIMINATING DEVICE FOR TELEPHONE TRANSMITTERS

Luther A. Smith, Graham, N. C., assignor to Western Electric Company, Incorporated, New York, N. Y., a corporation of New York Application April 28, 1952, Serial No. 284,795

8 Claims. (Cl. 179—187)

This invention relates to noise eliminators, and more particularly to noise eliminating devices for use with telephone transmitters.

It is an object of this invention to provide a telephone transmitter with a compact device for preventing extraneous noises from reaching the telephone transmitter while normal conversation is passed therethrough without echo.

One embodiment of the invention comprises a plurality of superimposed alternate rings and disks having a voice path therethrough, the voice path being a labyrinth formed by staggered apertures in the plurality of stacked disks and sound wave directing members mounted between these disks.

A complete understanding of the invention may be obtained from the following detailed description when taken in conjunction with the accompanying drawing, in which.

Figure 1:
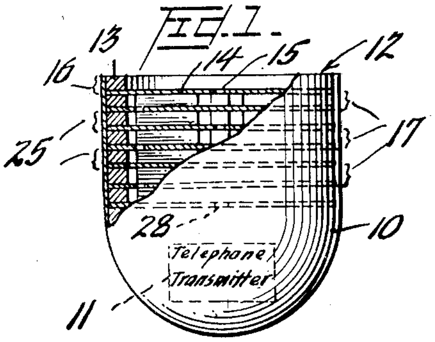
Fig. 1 is an end view of a telephone instrument with its housing partially broken away to disclose a noise eliminating device embodying the features of the present invention.

Referring now to the drawings, wherein like reference numerals designate the same parts throughout the several views, attention is first directed to Fig. 1 in which a housing 10 of a telephone handset is shown enclosing a telephone transmitter 11 and a noise eliminating device 12 embodying a preferred form of the invention. This noise eliminating device 12 is adapted to be used with any telephone transmitter such as a variable-resistance granular-carbon type, an electrodynamic type, a piezoelectric type, or any other type used in radio or telephone installations.

The noise eliminating device 12, shown in the partial section of Fig. 1, is separated into its component parts in Figs. 2, 3, 4, and 5 so that said disclosures thereof represent adjacent layers which are repeated in stacked relationship to form the noise eliminating device.

Figure 2:
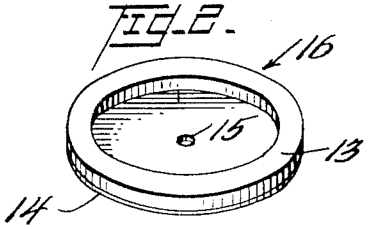
Fig. 2 is an isometric view of a ring and disk assembly included in the construction shown in Fig. 1.

A ring 13 of rectangular cross section is mounted on a disk 14 having an aperture 15 in the center thereof, as shown in Fig. 2, which assembly of ring and apertured disk constitutes a first layer 16 of the device 12 (Fig. 1). A second layer 17 comprises a ring 18, a disk 19 having off-center or staggered apertures 20 therein, and a plurality of sound wave directing members 22 as shown in the exploded view of Fig. 3 and in the assembled view of Fig. 5. A third layer 25 (Fig. 4) of the device 12 comprises a ring 26, a disk 27 having a central aperture 28 and four sound wave directing members 29 which are mounted on the disks to provide sound wave channels and to prevent echoes.

Figure 3:
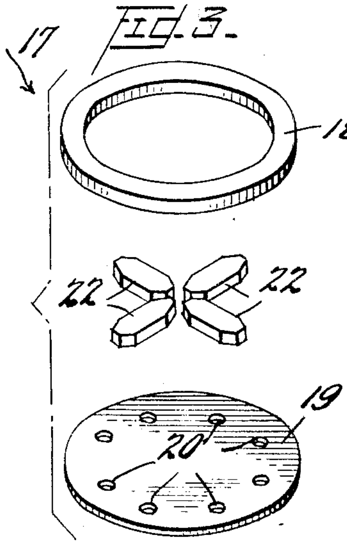
Fig. 3 is an exploded isometric view of one of a plurality of sound wave directing assemblies comprising a ring, an apertured disk, and sound wave directing members.
Figure 4:
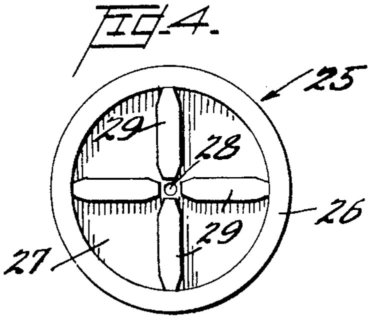
Fig. 4 is a plan view of another assembly of a ring, a disk, and other sound wave directing members included in the device of Fig. 1.
Figure 5:
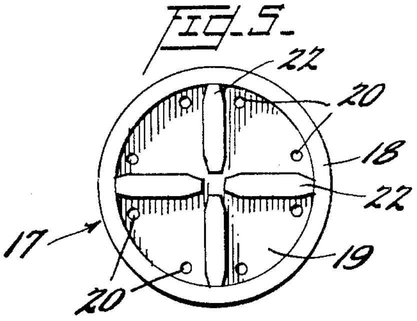
Fig. 5 is a plan view of the particular assembly shown in Fig. 3.
Figures 6, 7:
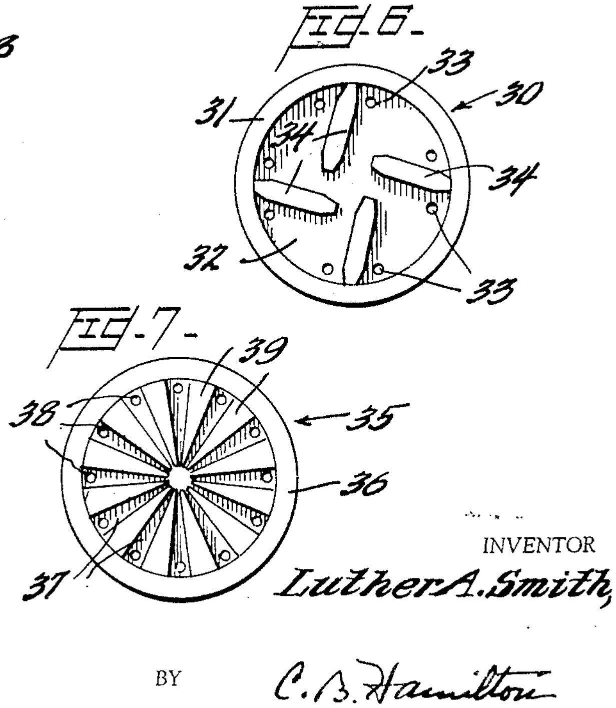
Fig. 6 is a plan view of a different arrangement of the assembly of the ring, disk, and sound wave directing members.
Fig. 7 is a plan view of still another embodiment of an assembly of the ring, disk, and sound wave directing members.

In Fig. 6 a different type of layer 30 includes a ring 31, a disk 32 having off-center apertures 33 therein, and four sound wave directing members 34. This layer 30 illustrates a configuration of sound wave directing members that could be used as a substitute for the configuration of layer 17 as shown in Fig. 3.

In Fig. 7 a layer 35 is shown as comprising a ring 36, a disk 37 having off-center apertures 36 therein, and sound wave directing members 39. The layer 35 illustrates the use of wedge-shaped sound wave directing members as another embodiment of the invention.

The layers of the device 12 shown in the several figures may be molded in one piece or assembled from individual rings, disks, and sound wave guide members, and may be secured together by any suitable means such as cement. Manifestly, many variations may be made in the construction of the layers, innumerable geometric patterns may be manufactured, and the number of the layers can be varied without departing from the scope of this invention. The above described layers may be made of any suitable material such as a plastic or a phenolic laminate and the layers of Figs. 2, 4, 5, 6, and 7 may be put together in various combinations to create the device 12.

In operation, sound waves emitted by a person speaking into the device 12 (Fig. 1) are directed through the aperture 15 and are guided by the sound wave directing members 22 into the apertures 20. The vocal sound waves passing through the apertures 20 are then guided by the sound wave directing members 29 (Figs. 1 and 4) through the aperture 28 to impinge upon the telephone transmitter 11 where only three layers 16, 17, and 25 are provided. When a plurality of layers 17 and 25 are provided in the device 12, as shown in Fig. 1, then the vocal sound waves travel as above described through a longer labyrinth. Thus extraneous noises are eliminated from the telephone transmitter by the shielding and attenuating effect of the device 12 and only the conversation directed into said device will be received by the transmitter 11 to provide good voice transmission in noisy locations.

What is claimed is:

1. A noise eliminating device for use in a telephone transmitter housing comprising a series of disks having apertures therein, any aperture of any disk being in staggered relationship with any aperture of an adjacent disk, a series of rings of predetermined thickness for separating the disks, and a plurality of sound wave directing members mounted on predetermined disks for directing sound waves passing through the device to a transmitter.

2. A device for a telephone transmitter for eliminating extraneous noises therefrom comprising a plurality of spaced rings in stacked relationship, a plurality of disks having apertures therein and mounted between said rings, each disk aperture being staggered with respect to adjacent disk apertures, and a plurality of spaced sound wave directing members mounted on each disk for providing sound wave paths between said apertures and for preventing echoes.

3. A device incorporated in a telephone transmitter housing for eliminating extraneous noises therefrom comprising a plurality of disks having apertures therein, said apertures being offset with respect to each other to provide a tortuous sound path, a series of rings separating the disks and secured thereto, and a plurality of octagonal shaped sound wave directing members mounted on predetermined disks for providing sound wave paths between the said apertures and for preventing echoes.

4. A device for eliminating extraneous noises from a telephone transmitter comprising a plurality of stacked disks, rings inserted between the disks for spacing them, said disks having spaced apertures, and means inserted in a predetermined pattern within certain of the rings to provide labyrinth paths between the apertures of the disks to a telephone transmitter.

5. A device incorporated in a telephone transmitter housing for eliminating extraneous noises comprising a first plurality of disks, each having a central aperture therein; a second plurality of disks, each having symmetrically-located off-center apertures therein and positioned between the disks of said first plurality, a plurality of rings positioned between the disks of said first and second plurality and secured thereto for forming a stack of alternate rings and disks, and sound wave directing members mounted on the disks of said first and second plurality of disks for forming paths between each said central aperture and said symmetrically-located off-center apertures to create a labyrinth for sound waves passing through the device to a transmitter.

6. A device incorporated in a telephone transmitter housing for eliminating extraneous noises comprising a first disk having a central aperture therein, a first ring mounted on top of the first disk, a second disk having a plurality of symmetrically-located off-center apertures therein, a second ring mounted on top of the second disk and beneath the first disk, a first plurality of sound wave directing members mounted on the top of the second disk and spaced from each other to form sound wave paths between the apertures of said first and second disks, a third disk having a central aperture therein, a third ring mounted on the top of the third disk and beneath the second disk, and a second plurality of sound wave directing members mounted on the third disk and spaced from each other to provide sound wave paths between the apertures of said second and third disks.

7. A device incorporated in a telephone transmitter housing for eliminating extraneous noises therefrom comprising a plurality of disks having apertures therein, said apertures being offset with respect to each other to provide a tortuous sound path, a series of rings separating the disks and secured thereto, and a plurality of wedge-shaped sound wave directing members mounted on predetermined disks for providing sound wave paths.

8. A device incorporated in a telephone transmitter housing for eliminating extraneous noises therefrom comprising a plurality of disks having apertures therein, said apertures being located alternately in the center and symmetrically off-center, a series of rings separating said disks and secured thereto, and a plurality of sound wave directing members mounted on alternate disks in such a manner as to be askew to the radii of said disks for providing increased tortuous paths for sound waves.

References Cited in the file of this patent

UNITED STATES PATENTS

| Number | Name | Date |
|---|---|---|
| 1,025,992 | Pape | May 14, 1912 |
| 1,915,358 | Giles | June 27, 1933 |
| 2,205,670 | Pye | June 25, 1940 |
| 2,645,301 | De Vries | July 14, 1953 |